H. A. HAVENS.
APPARATUS FOR MAKING CABLE GRIPS.
APPLICATION FILED FEB. 24, 1913.
1,086,664.
Patented Feb. 10, 1914.
2 SHEETS—SHEET 2.
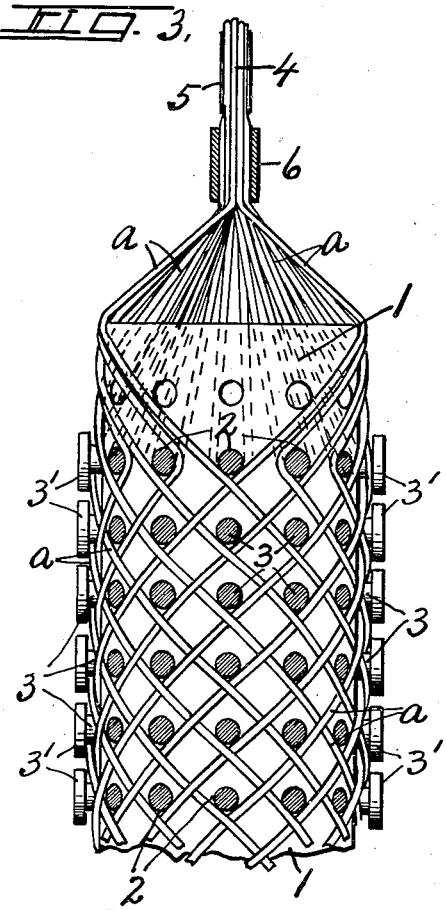
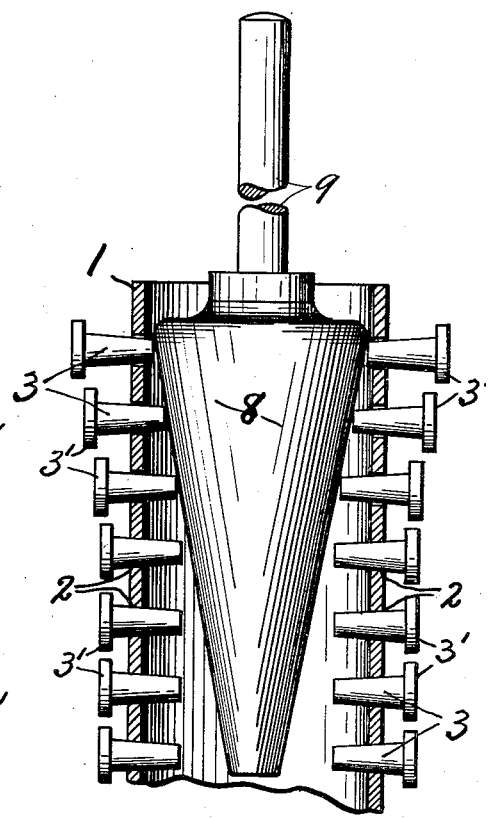
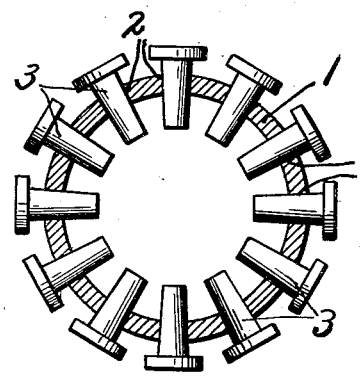
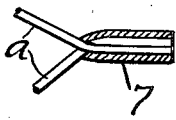
INVENTOR.
BY
ATTORNEY.

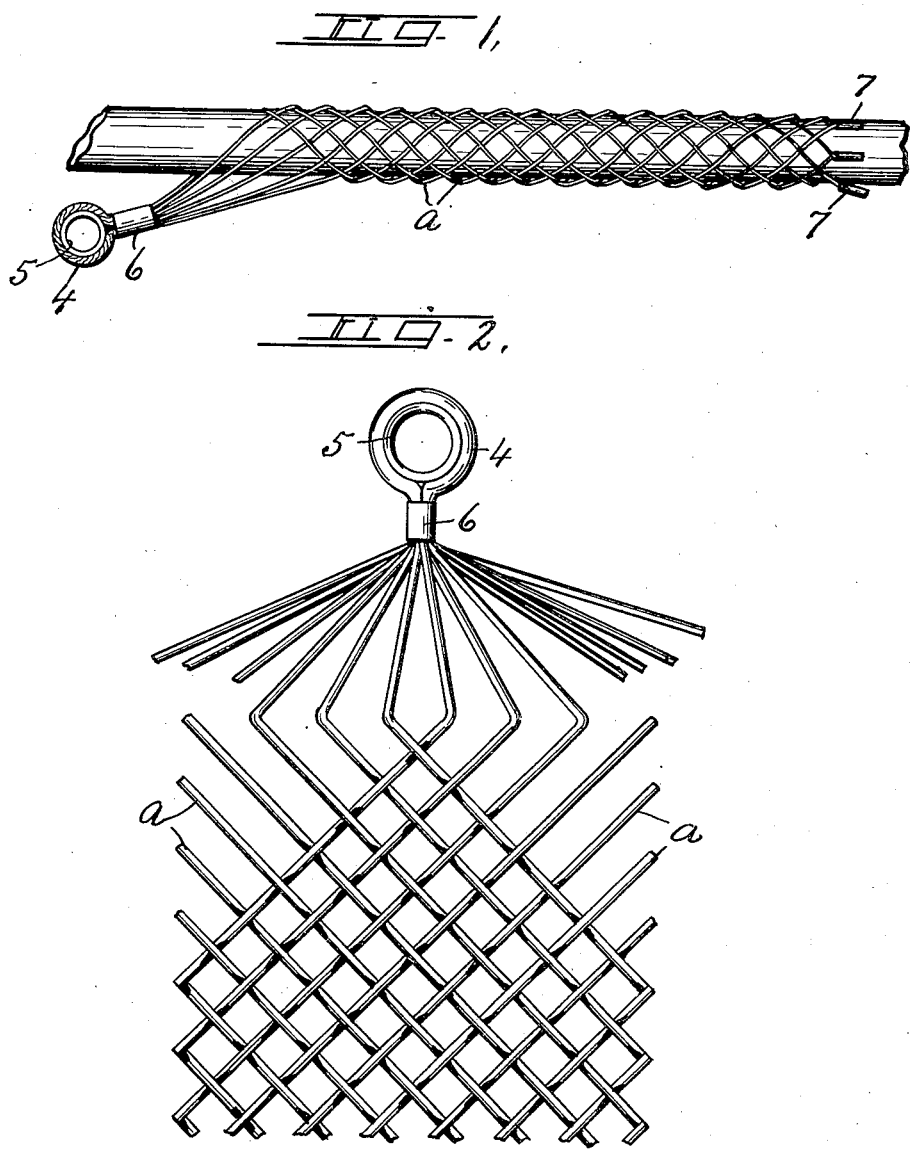

UNITED STATES PATENT OFFICE.

HAROLD A. HAVENS, OF SYRACUSE, NEW YORK.

APPARATUS FOR MAKING CABLE-GRIPS.

1,086,664.  Specification of Letters Patent.  Patented Feb. 10, 1914.

Application filed February 24, 1913. Serial No. 750,446.

*To all whom it may concern:*

Be it known that I, HAROLD A. HAVENS, of Syracuse, in the county of Onondaga, in the State of New York, have invented new and useful Improvements in Apparatus for Making Cable-Grips, of which the following, taken in connection with the accompanying drawings, is a full, clear, and exact description.

This invention relates to certain improvements in apparatus for making cable grips.

The cable grip devices preferably consist of a series of stranded wires woven or braided around a cylindrical body to form a tubular open-mesh netting capable of expansion and contraction under axial compression and distention; and such grip is adapted to be applied to relatively large wires, underground cables, pipes, and the like for drawing the same through subway conduits or for drawing together the ends of broken trolley wires and other cables preparatory to reuniting them at such ends. The operation of this class of grips is well known and, therefore, may not be further described except that one of the objects of my present invention is to unite all of the strands of the grip into a single loop at one side of its axis, thereby allowing a cable, pipe or other object to be passed entirely through and beyond the ends of the grip, leaving the loop at one side of the object for attachment to suitable tackle whereby such object may be drawn lengthwise.

The main object is to expedite the work and materially increase the output of grips for a given period of time and at the same time to proportionately decrease the cost of manufacture.

Other objects and uses relating to specific parts of the grip and form upon which it is made will be brought out in the following description.

In the drawings—Figure 1 is a side elevation of my improved grip as applied to a cable or casing therefor for drawing the same through subway conduits and similar uses. Fig. 2 is a development of a portion of the same grip enlarged. Fig. 3 is an enlarged side elevation of a cylindrical form and strand-retaining pins showing the manner of forming the grip thereon. Fig. 4 is a sectional view through the same form and the tapering wedge for removing the pins after the grip is completed. Fig. 5 is a cross sectional view through the same cylinder showing the symmetrical arrangement of the radial pins therein. Fig. 6 is a sectional view of two of the wire-ends showing the metal band for binding such ends together.

In the manufacture of these grips, I first provide a hollow or tubular cylinder 1, preferably a common metal pipe of suitable gage according to the size of the grip which is to be formed, said pipe being provided with a series of circumferential and longitudinal rows of radial apertures 2 arranged uniform distances apart circumferentially and longitudinally for receiving a corresponding number of tapering pins or studs 3 which are inserted, one by one, by hand into the apertures from the top of the tube downward as the braiding operation progresses. A series of wires $a$, preferably stranded and of uniform length, are then bunched together and bent intermediate their ends in the form of a loop 4 around and upon the periphery of a suitable metal eye or ring 5 which retains the loop 4 in circular form, the ends of the strands adjacent the loop 4 being passed through and bound together by a metal band or sleeve 6 of suitable length to firmly hold the loop in proper form and in engagement with the eye 5. This eye may then be engaged with a hook or other support (not shown) in such manner and in such relation to the upright cylinder 1 as to allow the strands to hang downwardly with the eye at one side of the cylinder whereupon the braiding operation is begun from the top of the cylinder downwardly around the studs or pins 3 in the manner shown in Figs. 2 and 3, it being understood that these pins or studs lie loose on a bench or other support within easy reaching distance of the operator and are successively placed in their respective apertures from the top of the cylinder downward as the braiding operation progresses. The wires are preferably drawn spirally around the cylinder from opposite sides thereof and against the lower sides of the studs so as to intersect each other at their points of engagement with the studs which are provided with large heads 3' for holding the intersecting portions of the strands against the periphery of the cylinder during the braiding operation. That is, as the strands are brought from opposite sides of the stud around and under the same, such stud is driven by a hammer or other tool tightly into the corresponding aperture of the cylinder, thus causing the head of the stud to firmly bind and hold the intersecting portions of the wires against the periphery of the cylinder, this operation being repeated with each stud as the braiding of the strands progresses. When the grip is completed to the desired length, the free ends of the corresponding pairs of strands are bound together by bands 7 or equivalent binding means so as to leave the end of the cable open and at the same time to secure the strands against unbraiding after which the pins or studs 3 are removed by the insertion of a tapering member 8 operated by hand through the cylinder from one end to the opposite end, thereby easily and quickly removing all of the studs which may be forced entirely from the cylinder and allowed to drop to the bench or other underlying support ready for a repetition of the operation previously described in the formation of another grip, said tapering member being provided with a handle 9 by which it may be inserted into and withdrawn from the cylinder.

The taper of the stud-releasing member 8 is shown as somewhat long and the angle rather sharp, but it is evident that the length and angle of the taper member may be varied at will without departing from the spirit of this invention. It is further evident that the size of the cylinder and also the number and size of the pins or studs 3 may be varied to conform to the size of grip which it may be desired to produce.

By bringing the looped ends of the strands wholly to one side of the cylinder in the formation of the grip and binding such looped ends together in the manner described, thus forming a single draft-loop, it is evident that the pull on all of the strands when the grip is applied to an object to be moved is uniform, each strand taking an equal part of the strain as distinguished from other grips in which half of the strands are used to form one loop and the other half to form a separate loop. This manner of forming the grip also leaves both ends open to permit a cable or other object to be passed entirely through the grip, as for example, when it is desired to draw the ends of two cables or of a broken cable together for uniting or coupling them one with the other.

What I claim is:

1. Apparatus for making cable grips, comprising a tubular member having symmetrically arranged radial openings, studs slidable in said openings around which the strands of the grip are to be passed, and a tapering member movable in the cylinder against the inner ends of the studs for forcing them outwardly.

2. In an apparatus for making braided wire cable grips, a cylinder having a system of radial apertures, tapering studs slidable in the apertures for holding the strands of the grip as the braiding work progresses, and means movable within the cylinder for forcing the studs outwardly.

3. An apparatus for making braided wire cable grips, comprising a cylinder having a system of radial apertures, studs slidable in the apertures with a tight driving fit and having their outer ends provided with heads for engaging the strands of the grip as the work of braiding progresses, and means movable within the cylinder for engaging the inner ends of the studs and forcing said studs outwardly to release them from their holding positions.

4. An apparatus for making braided wire cable grips, comprising a cylinder having a series of circumferential and longitudinal rows of apertures, tapering studs slidable with a driving fit in the apertures and having their outer ends provided with heads for engaging and holding the strands of the grip against the periphery of the cylinder, and a tapering member movable within the cylinder for engaging the inner ends of the studs and forcing them outwardly from their holding positions.

5. Apparatus for making cable grips, comprising a tubular member having symmetrically arranged radial openings, studs slidable in said openings around which the strands of the grip are to be passed, and means movable relatively to the cylinder for forcing the studs outwardly.

6. Apparatus for making cable grips, comprising a tubular member having symmetrically arranged radial openings, studs slidable in said openings around which the strands of the grip are to be passed, and means movable lengthwise of the cylinder against the studs for forcing them outwardly.

In witness whereof I have hereunto set my hand this 21st day of February, 1913.

HAROLD A. HAVENS.

Witnesses:
H. E. CHASE,
EVA E. GREENLEAF.